US009135617B2

(12) United States Patent  
Cho et al.

(10) Patent No.: US 9,135,617 B2  
(45) Date of Patent: Sep. 15, 2015

(54) CARD PAYMENT SYSTEM

(71) Applicant: KT Corporation, Seongnam-si, Gyeonggi-do (KR)

(72) Inventors: Youngbin Cho, Seoul (KR); Sung-chul Kim, Goyang-si (KR); Youn-pil Jeung, Seongnam-si (KR)

(73) Assignee: KT Corporation (KR)

( * ) Notice: Subject to any disclaimer, the term of this patent is extended or adjusted under 35 U.S.C. 154(b) by 37 days.

(21) Appl. No.: 14/013,116

(22) Filed: Aug. 29, 2013

(65) Prior Publication Data

US 2014/0061301 A1 Mar. 6, 2014

(30) Foreign Application Priority Data

Aug. 29, 2012 (KR) .................. 10-2012-0095210

(51) Int. Cl.
*G06Q 20/34* (2012.01)
*G06Q 20/32* (2012.01)
*G07F 7/08* (2006.01)
*H04M 1/21* (2006.01)

(52) U.S. Cl.
CPC ........ *G06Q 20/3567* (2013.01); *G06Q 20/3226* (2013.01); *G06Q 20/3229* (2013.01); *G06Q 20/3272* (2013.01); *G06Q 20/347* (2013.01); *G06Q 20/353* (2013.01); *G07F 7/0873* (2013.01); *H04M 1/21* (2013.01)

(58) Field of Classification Search
CPC ....... G06Q 20/30; G06Q 20/32; G06Q 20/34; G06Q 20/36; G06Q 20/353
USPC .......................................... 235/380, 379, 449
See application file for complete search history.

(56) References Cited

U.S. PATENT DOCUMENTS

| | | | |
|---|---|---|---|
| 2007/0220597 A1* | 9/2007 | Ishida | 726/8 |
| 2009/0158048 A1* | 6/2009 | Kim et al. | 713/184 |
| 2010/0017615 A1* | 1/2010 | Boesgaard Sorensen | 713/176 |
| 2010/0263029 A1* | 10/2010 | Tohmo et al. | 726/6 |
| 2010/0314446 A1* | 12/2010 | Morley, Jr. | 235/449 |
| 2011/0290874 A1* | 12/2011 | Tang et al. | 235/379 |
| 2012/0066504 A1* | 3/2012 | Hird et al. | 713/183 |
| 2012/0095867 A1* | 4/2012 | McKelvey | 705/26.41 |
| 2013/0087614 A1* | 4/2013 | Limtao et al. | 235/449 |

FOREIGN PATENT DOCUMENTS

KR 10-0481439 B1 4/2005

* cited by examiner

*Primary Examiner* — Allyson Trail
(74) *Attorney, Agent, or Firm* — Brundidge & Stanger, P.C.

(57) ABSTRACT

In one example embodiment, a card payment system includes a card payment apparatus, having an audio jack, configured to: read account information stored on a payment card, encode a counter value of the card payment apparatus into a onetime password, transmit the account information and onetime password via a microphone contact of the audio jack, and receive an acoustic signal via at least one earphone contact of the audio jack; and a client device, having an audio jack socket to receive the audio jack, configured to: receive the account information and onetime password via the microphone contact, transmit, to the card payment apparatus, the acoustic signal via the at least one earphone contact, decode the onetime password into the counter value, and authenticate the card payment apparatus based on the counter value of the card payment apparatus and a counter value of the client device.

25 Claims, 9 Drawing Sheets

CARD PAYMENT SYSTEM

TECHNICAL FIELD

The embodiments described herein pertain generally to a card payment system.

BACKGROUND

Making electronic payments for goods and services has become increasingly convenient in many contexts. Companies and individuals routinely use credit cards to buy goods online and to remit payments to service providers.

SUMMARY

In one example embodiment, a card payment system includes a card payment apparatus, having an audio jack, configured to: read account information stored on a payment card, encode a counter value of the card payment apparatus, which is stored in a memory of the card payment apparatus, into a onetime password, transmit the account information and the onetime password via a microphone contact of the audio jack, and receive an acoustic signal via at least one earphone contact of the audio jack; and a client device, having an audio jack socket to receive the audio jack, configured to: receive, from the card payment apparatus, the account information and the onetime password via a receptor for the microphone contact of the audio jack, transmit, to the card payment apparatus, the acoustic signal via a receptor for the at least one earphone contact of the audio jack, decode the onetime password into the counter value of the card payment apparatus, and authenticate the card payment apparatus based on the counter value of the card payment apparatus and a counter value of the client device, which is stored in a memory of the client device.

In another example embodiment, an apparatus includes an audio jack having at least one earphone contact and a microphone contact; a card reader configured to read account information stored on a payment card; and a signal processor configured to: encode a counter value stored in a memory into a onetime password, and transmit, to a client device, the account information and the onetime password via the microphone contact.

In yet another example embodiment, a client device includes an audio jack socket configured to receive an audio jack of a card payment apparatus, the audio jack including at least one earphone contact and a microphone contact; a transceiver configured to: receive, from the microphone contact, account information stored on a payment card and a onetime password, and transmit, to the at least one earphone contact, a request to read the account information; a signal generator configured to generate the request; a signal processor configured to decode the onetime password into a counter value of the card payment apparatus; and an authenticator configured to: determine that the counter value of the card payment apparatus corresponds to a counter value stored in a memory of the client device, and authenticate the card payment apparatus.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

DETAILED DESCRIPTION

Figure 1:
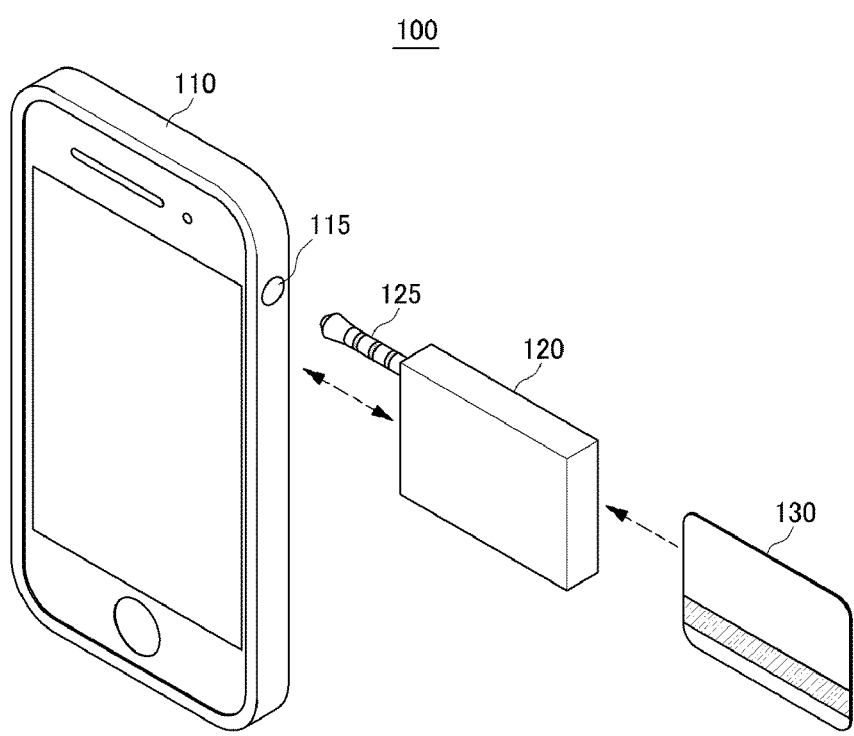
FIG. 1 shows an example system configuration in which one or more embodiments of a card payment system may be implemented.

In the following detailed description, reference is made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

FIG. 1 shows an example system configuration 100 in which one or more embodiments of a card payment system may be implemented. As depicted in FIG. 1, system configuration 100 includes, at least, a client device 110, and a card payment apparatus 120. Client device 110 may refer to at least one of a device that has an audio jack socket 115, such as a mobile phone, a portable device, a notebook, or even a personal computer or a personal communication terminal, such as PCS (Personal Communication System), GMS (Global System for Mobile communications), PDC (Personal Digital Cellular), PDA (Personal Digital Assistant), IMT (International Mobile Telecommunication)-2000. Client device 110 and card payment apparatus 120 may be connected when audio jack socket 115 corresponding to client device 110 receives an audio jack 125 corresponding to card payment apparatus 120.

Client device 110 may be configured to receive, from card payment apparatus 120 via audio jack 125, a first analog signal to which a first digital signal is converted. The first digital signal may include account information that may be read from a payment card 130 by card payment apparatus 120. By way of example, but not limitation, the account information may include at least one of an account number, a card expiration date, etc. The first digital signal may further include a onetime password to which a counter value stored in a memory of card payment apparatus 120 is encoded. The "onetime password" may refer to a password that is valid for only one login session or transaction. The "counter value" of card payment apparatus 120 may refer to a number that may indicate how many times card payment apparatus 120 reads the account information. Optionally, the first digital signal may further include at least one of a personal identifier of a user who owns or otherwise exercises control over an embodiment of card payment apparatus 120 or a digital unique identifier of card payment apparatus 120. By way of example, but not limitation, the digital unique identifier may include an identifier number or a serial number assigned to card payment apparatus 120.

Card payment apparatus 120 may be configured to convert the read account information and onetime password into the first analog signal by using any well-known digital-analog converting scheme. Further, card payment apparatus 120 may be configured to convert at least one of the personal identifier of the user or digital unique identifier of card payment apparatus 120 as well as the read account information and the onetime password into the first analog signal. Card payment apparatus 120 may be configured to then transmit the converted first analog signal to client device 110 via audio jack 125.

Client device 110 may be further configured to generate an acoustic signal, such as a sound signal. By way of example, but not limitation, client device 110 may generate the acoustic signal based on at least one of a waveform, a frequency, a duration, an amplitude, or a phase of an analog signal. The generated acoustic signal may be transmitted to card payment apparatus 120 via audio jack 125. Further, client device 110 may be configured to generate a second digital signal that includes a request for card payment apparatus 120 to read the account information from payment card 130. By way of example, but not limitation, client device 110 may generate the second digital signal based on at least one of a frequency, a bit rate, or a bit interval of at least one of a pulse signal or a rectangular signal. Client device 110 may be further configured to convert the generated second digital signal into a second analog signal by using any well-known digital-analog converting scheme and to transmit the converted second analog signal to card payment apparatus 120 via a receptor for audio jack 125.

Further, client device 110 may be configured to convert the received first analog signal into the first digital signal, which includes the account information, onetime password, personal identifier of the user of card payment apparatus 120 and digital unique identifier of card payment apparatus 120, by using any well-known analog-digital converting scheme.

Client device 110 may be configured to then decode the onetime password into the counter value of card payment apparatus 120 by using any well-known encryption algorithm, using the personal identifier of the user of card payment apparatus 120. By way of example, but not limitation, client device 110 may retrieve a secret key of card payment apparatus 120 from an authenticating server (not illustrated in FIG. 1), which is communicatively coupled to client device 110, by using the personal identifier of the user of card payment apparatus 120 as an index. Then, client device 110 may decode the onetime password into the counter value by using the retrieved secret key. Alternatively, the personal identifier of the user of card payment apparatus 120 may be previously stored and registered in a memory of client device 110 and client device 110 may retrieve the secret key of card payment apparatus 120. The authenticating server may refer to an organization or entity that provides an authentication service, communication service, data storage service, data or information processing service, content service, or any combination thereof to business customers or consumers.

Further, client device 110 may configured to compare the counter value of card payment apparatus 120 and a counter value that is stored in the memory of client device 110. The "counter value" of client device 110 may refer to a number of times that client device 110 has received a card payment request from card payment apparatus 120. The counter value, which is stored in the memory of client device 110, may be set to an initial value, such as zero, and be increased by a predetermined value, such as one, when client device 110 receives the account information and onetime password (i.e., when client device 110 receives the first analog signal). Client device 110 may store the increased counter value in the memory of client device 110. Client device 110 may be configured to determine whether the counter value of card payment apparatus 120 corresponds to the increased counter value stored in the memory of client device 110, upon comparing. When the increased counter value of client device 110 is determined to correspond to the counter value of card payment apparatus 120, client device 110 may authenticate card payment apparatus 120 as an authenticated apparatus.

In some embodiments, client device 110 may be further configured to authenticate card payment apparatus 120 by using the digital unique identifier of card payment apparatus 120. By way of example, but not limitation, the digital unique identifier of card payment apparatus 120 may be pre-registered in the memory of client device 110 or the authenticating server (not illustrated in FIG. 1), which is communicatively coupled to client device 110, and client device 110 may determine that card payment apparatus 120 is a registered or authenticated apparatus by checking the memory or authenticating server.

Further, client device 110 may be configured to execute a card payment based at least in part on the account information through a card payment server (not illustrated in FIG. 1)

which is communicatively coupled to client device 110 via a wireless network. The card payment server may refer to an organization or entity that provides some type of communication service, data storage service, data or information processing service, content service, or any combination thereof to business customers or consumers. The card payment server may host one or more servers or other processing apparatuses that may be configured to receive the one or more card payment execution requests from client device 110, and to provide client device 110 with the one or more expressions of at least one result of the card payment execution in response to the received card payment execution requests. Non-limiting example of the card payment server may include a financial service provider, a banking service provider, or a credit card service provider.

Client device 110 may be further configured to receive the one or more expressions of at least one result of the card payment execution from the card payment server and to display the received expressions of the card payment execution on a display or a screen that is operatively coupled thereto.

Card payment apparatus 120 may be configured to receive the acoustic signal from client device 110 via audio jack 125. Card payment apparatus 120 may be further configured to convert electrical components of the received acoustic signal into electric power by using at least one electric circuit installed in card payment apparatus 120, so that card payment apparatus 120 may operate card payment apparatus 120.

Further, card payment apparatus 120 may be configured to receive the second analog signal from client device 110 via audio jack 125. Then, card payment apparatus 120 may be configured to convert the received second analog signal into the second digital signal that includes the request to read the account information from payment card 130 by using any well-known analog-digital converting scheme.

Card payment apparatus 120 may be further configured to read the account information from payment card 130. In some embodiments, card payment apparatus 120 may read the account information in response to receipt of the second digital signal that includes the card read request. By way of example, but not limitation, card payment apparatus 120 may have at least one of a magnetic strip reader that is configured to read information from a magnetic strip of payment card 130 or an integrated circuit chip reader that is configured to read information from an integrated circuit chip of payment card 130.

Further, card payment apparatus 120 may be configured to convert the first digital signal into the first analog signal by using any well-known digital-analog converting scheme and to transmit the converted first analog signal to client device 110 via audio jack 125. The first digital signal may include the account information read from payment card 130.

The first digital signal may further include a onetime password. Card payment apparatus 120 may be configured to encode a counter value, which is stored in the memory of card payment apparatus 120 into a onetime password by using any well-known encryption algorithm, using a personal identifier of a user of card payment apparatus 120 and a secret key of card payment apparatus 120. By way of example, but not limitation, the secret key of card payment apparatus 120 may be stored in the authenticating server in association with the personal identifier. The counter value, which is stored in the memory of card payment apparatus 120, may be set to an initial value, such as zero, and be increased by a predetermined value, such as one, when card payment apparatus 120 reads the account information from payment card 130. Card payment apparatus 120 may store the increased counter value in the memory of card payment apparatus 120 and encode the increased counter value into the onetime password. Card payment apparatus 120 may be further configured to then convert the first digital signal, which includes the account information and onetime password, into the first analog signal and to transmit the converted first analog signal to client device 110 via audio jack 125.

In some embodiments, card payment apparatus 120 may be configured to convert the first digital signal, which includes at least one of the personal identifier of the user or a digital unique identifier of card payment apparatus 120 as well as the account information and onetime password, into the first analog signal. Then, card payment apparatus 120 may transmit the converted first analog signal to client device 110 via audio jack 125.

Thus, FIG. 1 shows an example system configuration 100 in which one or more embodiments of a card payment system may be implemented.

Figure 2:
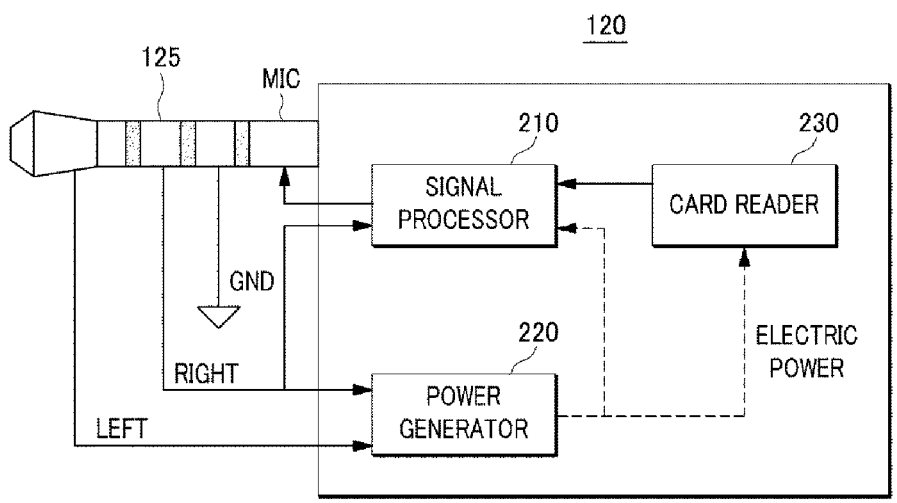
FIG. 2 shows an example configuration of a card payment apparatus by which at least portions of a card payment system may be implemented.

FIG. 2 shows an example configuration of a card payment apparatus 120 by which at least portions of a card payment system may be implemented. As depicted in FIG. 2, card payment apparatus 120, which is described above with regard to FIG. 1, may include audio jack 125, a signal processor 210, a power generator 220, and a card reader 230. Although illustrated as discrete components, various components may be divided into additional components, combined into fewer components, or eliminated altogether while being contemplated within the scope of the disclosed subject matter. Each function and/or operation of the components may be implemented, individually and/or collectively, by a wide range of hardware, software, firmware, or any combination thereof. In that regard, one or more of signal processor 210, power generator 220, and card reader 230 may be included in an instance of an application hosted by card payment apparatus 120.

In some embodiments, audio jack 125 may include at least one earphone contact, a ground contact and a microphone contact. Audio jack 125 may be inserted into audio jack socket 115 that is installed on a surface of client device 110. At least one analog signal associated with information or data may be transmitted from client device 110 to card payment apparatus 120 via the at least one earphone contact and, conversely, at least one analog signal may be transmitted from card payment apparatus 120 to client device 110 via the microphone contact.

By way of example, but not limitation, as depicted in FIG. 2, audio jack 125 may include two earphone contacts, one of which is connected to a left side earphone (i.e., left earphone contact) and the other one is connected to a right side earphone (i.e., right earphone contact).

In some embodiments, signal processor 210 may be configured to encode a counter value stored in a memory, which may be operatively coupled to card payment apparatus 120, into a onetime password by using any well-known encryption algorithm, using a personal identifier of a user of card payment apparatus 120 and a secret key of card payment apparatus 120. The counter value, which is stored in the memory, may be set to an initial value, such as zero, and be increased by a predetermined value, such as one, when card reader 230 reads account information from payment card 130. Signal processor 210 may store the increased counter value in the memory and encode the increased counter value into the onetime password.

Further, signal processor 210 may be configured to convert a first digital signal that includes the account information and onetime password into a first analog signal by using any well-known digital-analog converting scheme. Then, signal processor 210 may be configured to transmit the first analog signal to client device 110 via the microphone contact of audio jack 125.

In some other embodiments, the first digital signal may further include at least one of the personal identifier of the user or a digital unique identifier of card payment apparatus 120 in addition to the account information and onetime password. Signal processor 210 may be configured to convert the first digital signal into a first analog signal and to transmit the first analog signal to client device 110 via the microphone contact of audio jack 125.

In some embodiments, signal processor 210 may be configured to receive, from client device 110, an acoustic signal that includes a second analog signal via at least one of the two earphone contacts of audio jack 125 (e.g., right earphone contact). The second analog signal is a signal to which a second digital signal that includes a card read request is converted.

Signal processor 210 may be further configured to extract the second analog signal from the received acoustic signal and to convert the second analog signal into the second digital signal by using any well-known analog-digital converting scheme. By way of example, but not limitation, the acoustic signal may include a periodic signal portion and a non-periodic signal portion that is associated with the second digital signal. Signal processor 210 may extract the non-periodic signal portion of the acoustic signal and then, convert the non-periodic signal portion of the acoustic signal into the digital card read request.

In some embodiments, client device 110 may transmit, to card payment apparatus 120, the second analog signal separately with an acoustic signal that is used to generate electric power. Signal processor 210 may be configured to receive, from client device 110, the second analog signal via one of the two earphone contacts of audio jack 125 (e.g., right earphone contact) and to convert the received second analog signal into the second digital signal by using any well-known analog-digital converting scheme.

In some embodiments, power generator 220 may be configured to receive, from client device 110, the acoustic signal that includes the second analog signal, via at least one of the two earphone contacts of audio jack 125. Alternatively, power generator 220 may be configured to receive, from client device 110, the acoustic signal, which is not associated with digital data or information, via the other one of the two earphone contacts of audio jack 125 (e.g., left earphone contact).

Power generator 220 may be further configured to convert electrical components of the received acoustic signal into electric power to operate card payment apparatus 120. Then, power generator 220 may be configured to provide at least one of signal processor 210 or card reader 230 with the generated electric power.

Card reader 230 may be configured to read the account information of payment card 130. By way of example, but not limitation, the account information may include at least one of an account number, a card expiration date, etc. In some embodiments, card reader 230 may read the account information from a magnetic strip of payment card 130 or an integrated circuit chip of payment card 130. Card reader 230 may be further configured to transmit the account information to signal processor 210.

Thus, FIG. 2 shows an example configuration of card payment apparatus 120 by which at least portions of a card payment system may be implemented.

Figure 3:
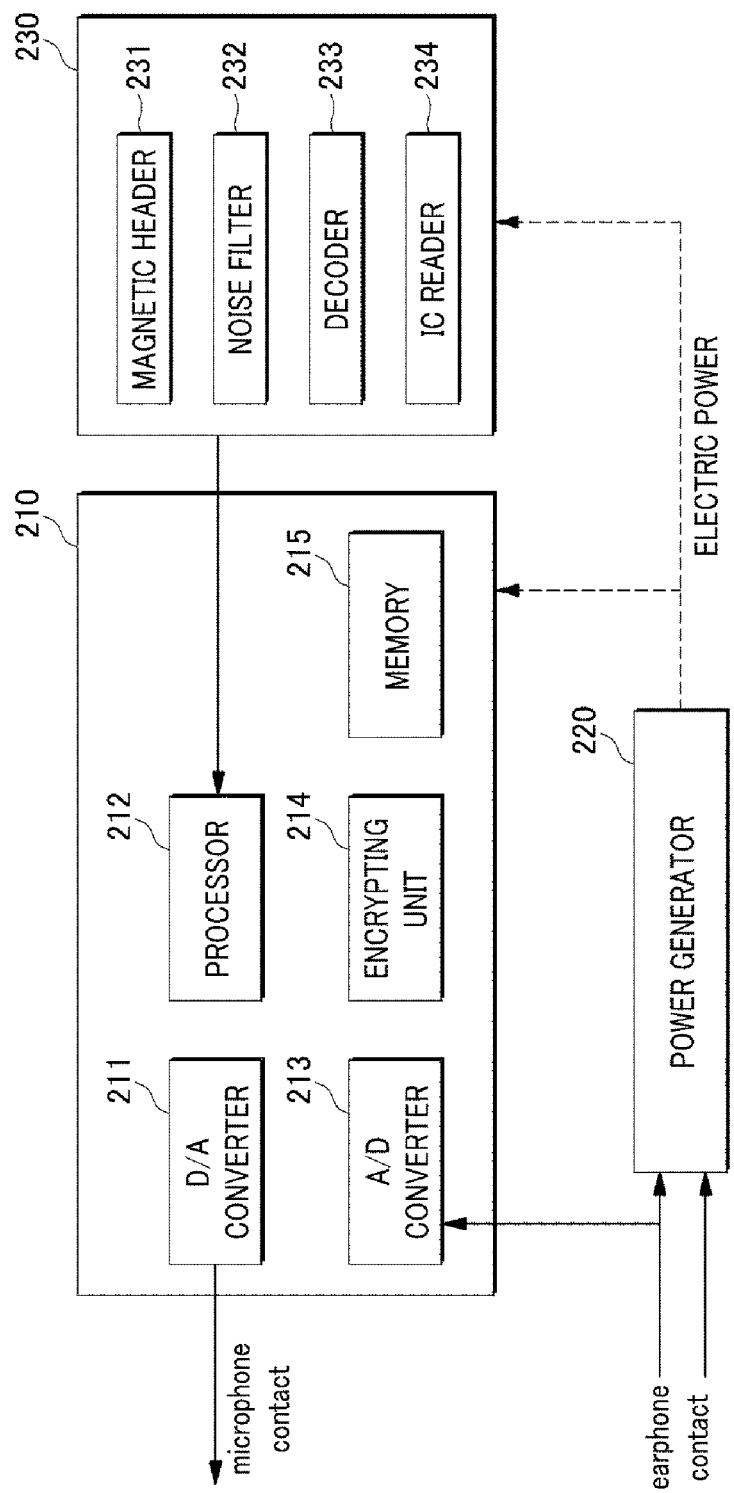
FIG. 3 shows a specific example configuration of a card payment apparatus by which at least portions of a card payment system may be implemented.

FIG. 3 shows a specific example configuration of a card payment apparatus by which at least portions of a card payment system may be implemented. As depicted in FIG. 3, signal processor 210, which is described above with regard to FIG. 2, may include a digital-analog converter 211, a processor 212, an analog-digital converter 213, an encrypting unit 214, and a memory 215. Card reader 230, which is described above with regard to FIG. 2, may include a magnetic header 231, a noise filter 232, a decoder 233, and an IC reader 234. Although illustrated as discrete components, various components may be divided into additional components, combined into fewer components, or eliminated altogether while being contemplated within the scope of the disclosed subject matter. Each function and/or operation of the components may be implemented, individually and/or collectively, by a wide range of hardware, software, firmware, or any combination thereof. In that regard, one or more of digital-analog converter 211, processor 212, analog-digital converter 213, encrypting unit 214, and memory 215 may be included in an instance of an application hosted by signal processor 210. Further, one or more of magnetic header 231, noise filter 232, decoder 233, and IC reader 234 may be included in an instance of an application hosted by card reader 230.

Digital-analog converter 211 may be configured to convert a first digital signal into a first analog signal by using any well-known digital-analog converting scheme. The first digital signal may include account information, which is read by card reader 230, and a onetime password to which a counter value stored in memory 215 is encoded. Optionally, the first digital signal may further include at least one of a personal identifier of a user of card payment apparatus 120 or a digital unique identifier of card payment apparatus 120. Further, the first digital signal may be encrypted by encrypting unit 214 by using any well-known encrypting scheme such as a Rivest Shamir Adleman scheme. Digital-analog converter 211 may be configured to convert the encrypted first digital signal into the first analog signal and to transmit the first analog signal to client device 110 via a microphone contact of audio jack 125.

Processor 212 may be configured to receive the account information, which is included in the first digital signal, from card reader 230 and to transmit the account information to encrypting unit 214. Processor 212 may be further configured to encode the counter value, which is stored in memory 215, into the onetime password by using any well-known encryption algorithm, using the personal identifier of the user and a secret key of card payment apparatus 120. The counter value may be set to an initial value, such as zero, and processor 212 may increase the counter value by a predetermined value, such as one, when card reader 130 reads the account information from payment card 130. Processor 212 may store the increased counter value in memory 215. Further, processor 212 may encode the increased counter value into the onetime password and transmit the onetime password to encrypting unit 214. Processor 212 may be further configured to control operations of digital-analog converter 211, analog-digital converter 213, and encrypting unit 214.

Analog-digital converter 213 may be configured to receive, from client device 110, a second analog signal via at least one earphone contacts of audio jack 125. The second analog signal is a signal to which a second digital signal that includes a card read request is converted. The second digital signal may be encrypted by client device 110. Analog-digital converter 213 may be further configured to convert the second analog signal into the second digital signal by using any well-known analog-digital converting scheme and to transmit the second digital signal to encrypting unit 214.

Encrypting unit 214 may be configured to encrypt the first digital signal by using any well-known encrypting-decrypting scheme such as a Rivest Shamir Adleman scheme and to provide the encrypted first digital signal to digital-analog converter 211. In some embodiments, encrypting unit 214 may encrypt the first digital signal which includes the account information and onetime password. In some other embodiments, encrypting unit 214 may encrypt the first digital signal which further includes the personal identifier of the user and the digital unique identifier of card payment apparatus 120, which are stored in memory 215. Further, encrypting unit 214 may be configured to decrypt the encrypted second digital signal by using any well-known encrypting-decrypting scheme such as a Rivest Shamir Adleman scheme and to provide the second digital signal to processor 212.

Memory 215 may be configured to store at least one of the account information, the counter value of card payment apparatus 120, the personal identifier of the user, the digital unique identifier of card payment apparatus 120, algorithms for encoding a onetime password, algorithms for encrypting-decrypting scheme, or predetermined instructions for operations of signal processor 210.

Power generator 220 may be configured to receive, from client device 110, an acoustic signal via at least one earphone contact of audio jack 125. Further, power generator 220 may be configured to convert electrical components of the received acoustic signal into electric power so that card payment apparatus 120 may operate card payment apparatus 120. Power generator 220 may be configured to provide signal processor 210 and card reader 230 with the generated electric power.

Magnetic header 231 may be configured to generate at least one periodic analog signal or non-periodic signal that has at least one waveform, at least one duration, or at least one frequency, if payment card 130 that includes a magnetic strip contacts with magnetic header 231 or approaches magnetic header 231.

Noise filter 232 may be configured to receive the analog signal from magnetic header 231 and to eliminate noise from the analog signal.

Decoder 233 may be configured to convert the analog signal, from which the noise is eliminated, into digital account information based on the at least one waveform, duration time or frequency of the analog signal.

IC reader 234 may be configured to read the digital account information from an integrated circuit chip of payment card 130 and to transmit the digital account information to signal processor 210.

Thus, FIG. 3 shows a specific example configuration of a card payment apparatus by which at least portions of a card payment system may be implemented.

Figure 4A:
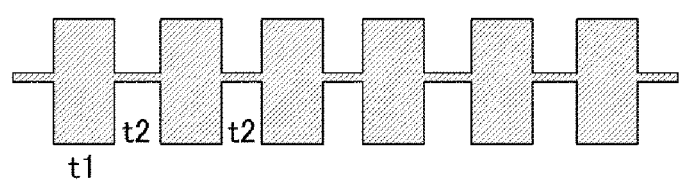
FIG. 4A shows an illustrative example of a signal generated and transmitted by a client device by which at least portions of a card payment system may be implemented.
Figure 4B:
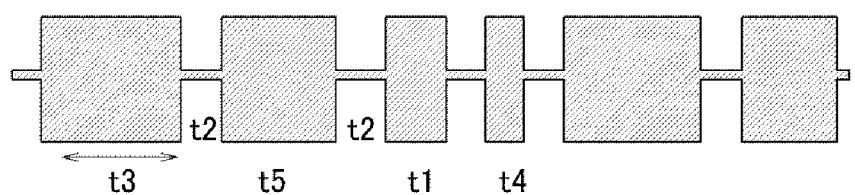
FIG. 4B shows another illustrative example of a signal generated and transmitted by a client device by which at least portions of a card payment system may be implemented.

FIG. 4A shows an illustrative example of a signal generated and transmitted by a client device 110 by which at least portions of a card payment system may be implemented and FIG. 4B shows another illustrative example of a signal generated and transmitted by a client device 110 by which at least portions of a card payment system may be implemented. As depicted in FIG. 4A, client device 110 may be configured to generate an acoustic signal that has a frequency and a regular magnitude. Client device 110 may transmit the periodic acoustic signal of FIG. 4A to card payment apparatus 120 and card payment apparatus 120 may generate electric power from the periodic acoustic signal.

As depicted in FIG. 4B, client device 110 may be configured to generate a non-periodic analog signal. By way of example, but not limitation, the non-periodic analog signal may include multiple numbers of waveforms, each of which is set to have a different duration time (e.g., t1, t3, t4, t5). Client device 110 may convert a digital signal such as a digital card read request into the non-periodic analog signal based on the each different duration time of the each of waveforms according to a predetermined algorithm. Client device 110 may transmit the non-periodic analog signal of FIG. 4B to card payment apparatus 120 and card payment apparatus 120 may convert the non-periodic analog signal into the digital card read request. Optionally, card payment apparatus 120 may also generate electric power from the non-periodic analog signal.

Thus, FIG. 4A shows an illustrative example of a signal generated and transmitted by client device 110 by which at least portions of a card payment system may be implemented and FIG. 4B shows another illustrative example of a signal generated and transmitted by client device 110 by which at least portions of a card payment system may be implemented.

Figure 5:
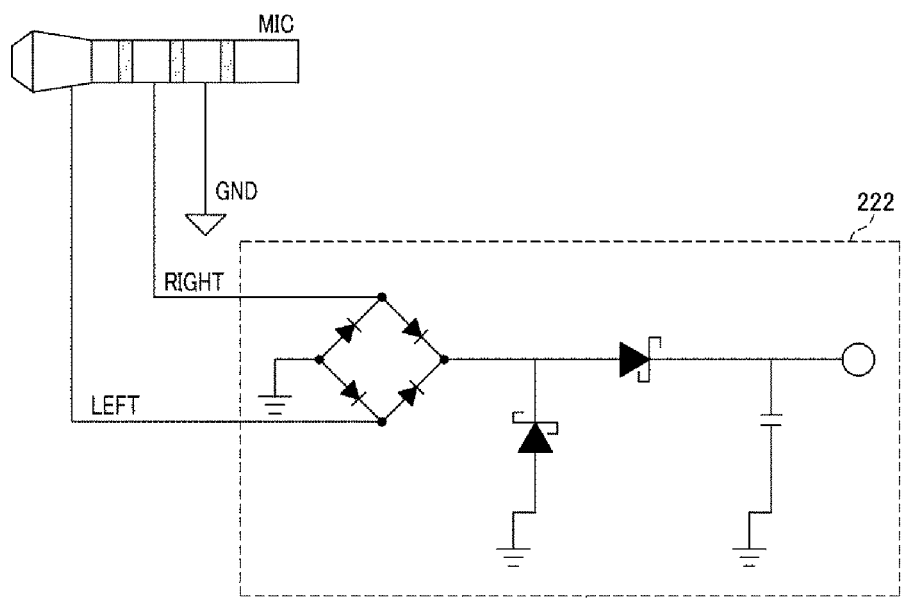
FIG. 5 shows an illustrative example of a circuit to generate electric power in an apparatus by which at least portions of a card payment system may be implemented.

FIG. 5 shows an illustrative example of a circuit to generate electric power in a card payment apparatus 120 by which at least portions of a card payment system may be implemented. In some embodiments, power generator 220 may include a circuit 222 that transforms an alternating current (AC) voltage of an acoustic signal, which is transmitted from client device 110, to a direct current (DC) voltage and boosts the direct current voltage. By way of example, but not limitation, circuit 222 may include at least one of a bridge circuit, a Schottky diode, a capacitor, or a combination thereof. The acoustic signal may be inputted to circuit 222 via at least one earphone contact (e.g., at least one left earphone contact or right earphone contact). Then, magnitudes of the voltage of the acoustic signal may be increased so that the increased voltage may be used as electric power to operate card payment apparatus 120.

Figure 6:
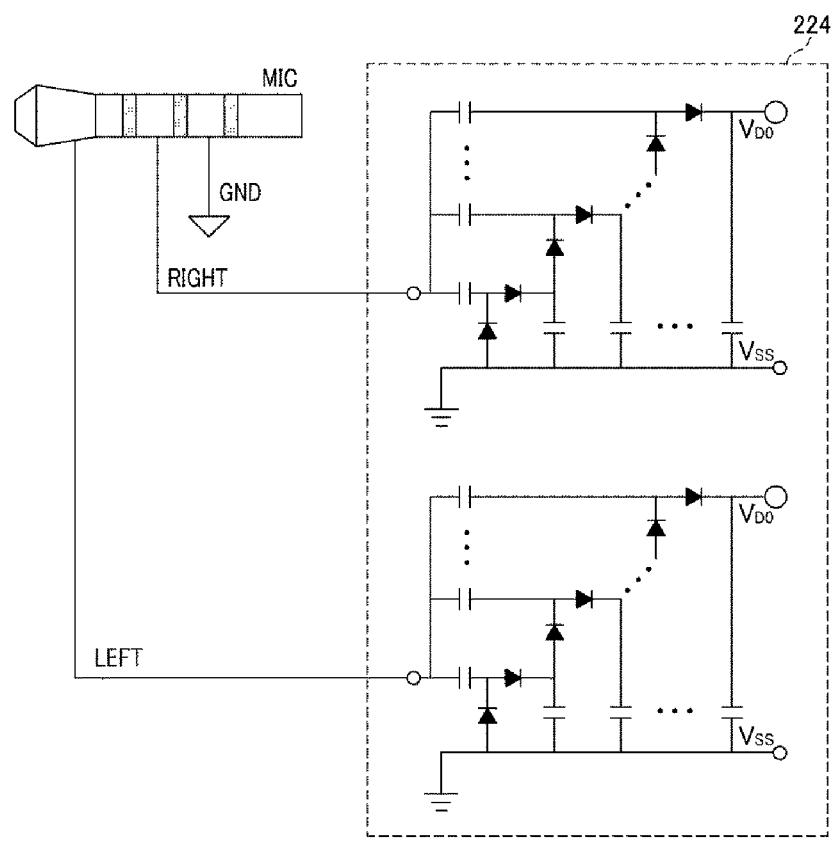
FIG. 6 shows another illustrative example of a circuit to generate electric power in an apparatus by which at least portions of a card payment system may be implemented.

FIG. 6 shows another illustrative example of a circuit to generate electric power in a card payment apparatus 120 by which at least portions of a card payment system may be implemented. In some embodiments, power generator 220 may include a circuit 224 that transforms an alternating current (AC) voltage of an acoustic signal, which is transmitted from client device 110, to a direct current (DC) voltage and boosts the direct current voltage. By way of example, but not limitation, circuit 224 may include two sub-circuits, each of which includes a multiplier circuit that includes multiple capacitors and diodes. One of the two sub-circuits may receive an acoustic signal via one earphone contact (e.g., right earphone contact) and the other of the two sub-circuits may receive an acoustic signal via the other earphone contact (e.g., left earphone contact). Then, each of the two sub-circuits may increase magnitudes of the voltage of the acoustic signals so that the increased voltage may be used as electric power to operate card payment apparatus 120.

Thus, FIG. 5 shows an illustrative example of a circuit to generate electric power in card payment apparatus 120 by which at least portions of a card payment system may be implemented and FIG. 6 shows another illustrative example of a circuit to generate electric power in card payment apparatus 120 by which at least portions of a card payment system may be implemented.

Figure 7A:
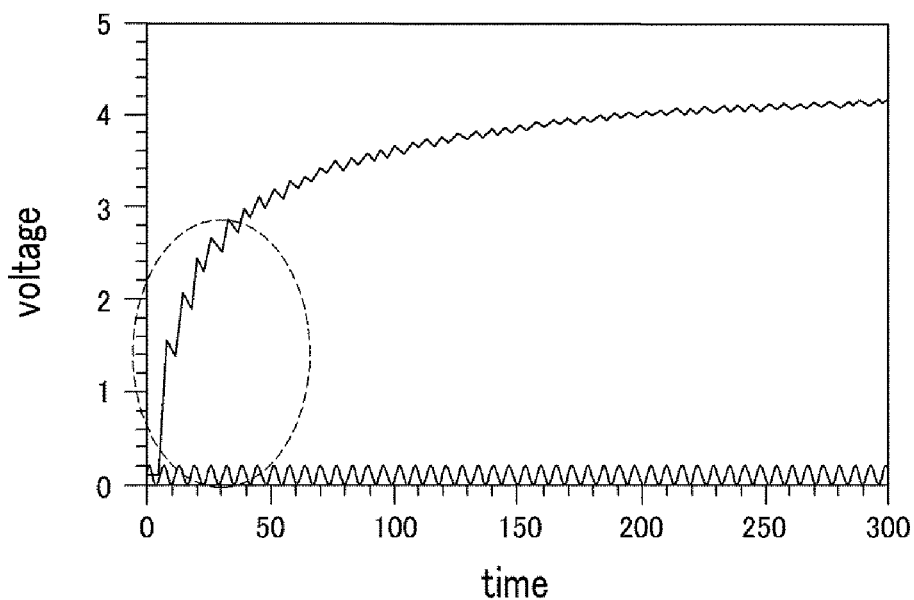
FIG. 7A shows an illustrative example of a graph of outputs from example circuits utilized to generate electric power in an apparatus by which at least portions of a card payment system may be implemented.
Figure 7B:
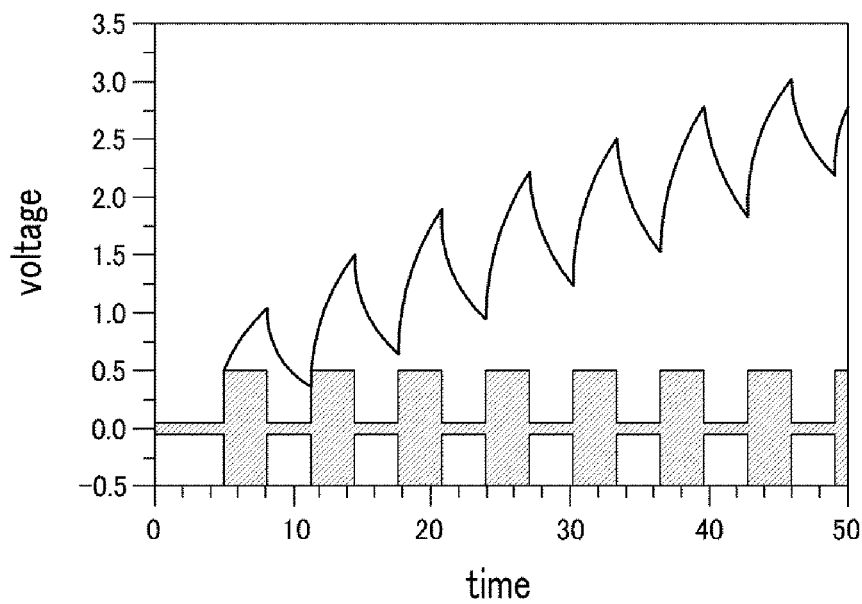
FIG. 7B shows an illustrative example of an enlarged graph of a part of the graph of FIG. 7A.

FIG. 7A shows an illustrative example of a graph of outputs from example circuits utilized to generate electric power in an apparatus by which at least portions of a card payment system may be implemented, and FIG. 7B shows an illustrative example of an enlarged graph of a part of the graph of FIG. 7A. In FIGS. 7A and 7B, an x-axis may refer to a time and a y-axis may refer to a magnitude of a voltage. In some embodiments, if an acoustic signal is inputted to circuit 222 or 224 of power generator 220, circuit 222 or 224 may be configured to transform an alternating current (AC) voltage of an acoustic signal to a direct current (DC) voltage and to increase magnitudes of the DC voltage while repeating boosting and reducing the magnitudes of the DC voltage.

Figure 8A:
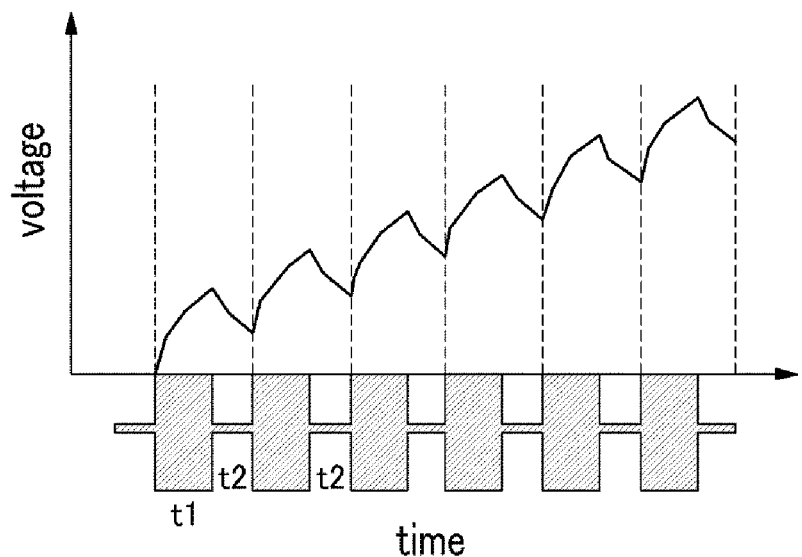
FIG. 8A shows another illustrative example of a graph of outputs from example circuits utilized to generate electric power in an apparatus by which at least portions of a card payment system may be implemented.
Figure 8B:
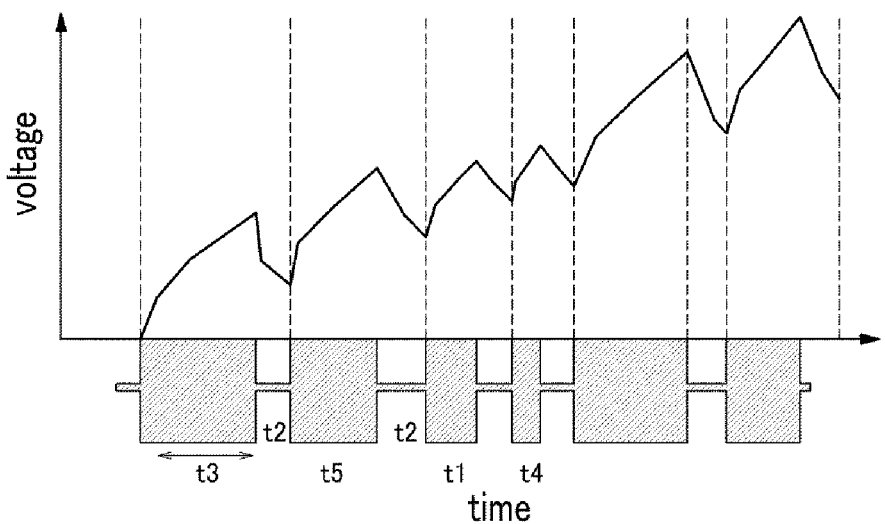
FIG. 8B shows still another illustrative example of a graph of outputs from example circuits utilized to generate electric power in an apparatus by which at least portions of a card payment system may be implemented.

FIG. 8A shows another illustrative example of a graph of outputs from example circuits utilized to generate electric power in an apparatus by which at least portions of a card payment system may be implemented, and FIG. 8B shows still another illustrative example of a graph of outputs from example circuits utilized to generate electric power in an apparatus by which at least portions of a card payment system may be implemented. In FIGS. 8A and 8B, an x-axis may refer to a time and a y-axis may refer to a magnitude of a voltage. FIG. 8A shows a graph of outputs from circuit 222 or 224 when circuit 222 or 224 receives a periodic analog signal from client device 110. Further, FIG. 8B shows a graph of outputs from circuit 222 or 224 when circuit 222 or 224 receives a non-periodic analog signal from client device 110. As depicted in FIGS. 8A and 8B, regardless of types of the analog signal, circuit 222 or 224 may be configured to transform an alternating current (AC) voltage of the periodic analog signal or the non-periodic analog signal to a direct current (DC) voltage and to increase magnitudes of the DC voltage while repeating boosting and reducing the magnitudes of the DC voltage.

As depicted in FIGS. 8A and 8B, the analog signal (i.e., acoustic signal), which is received by circuit 222 or 224, is a pulse signal that has at least one charging duration (e.g., t1, t3, t4, or t5) and at least one discharging duration (e.g., t2). Further, an absolute value of a voltage increase of the DC voltage in the at least one charging duration is greater than an absolute value of a voltage decrease of the DC voltage in the at least one discharging duration. By way of example, in case that circuit 222 or 224 receives a periodic signal as depicted in FIG. 8A, an absolute value of a voltage increase of the DC voltage in charging duration t1 is greater than an absolute value of a voltage decrease of the DC voltage in discharging duration t2. Further, in case that circuit 222 or 224 receives a non-periodic signal as depicted in FIG. 8B, an absolute value of a voltage increase of the DC voltage in charging duration t1, t3, t4 or t5 is greater than an absolute value of a voltage decrease of the DC voltage in discharging duration t2.

Thus, FIG. 7A shows an illustrative example of a graph of outputs from example circuits utilized to generate electric power in an apparatus by which at least portions of a card payment system may be implemented, FIG. 7B shows an illustrative example of an enlarged graph of a part of the graph of FIG. 7A, FIG. 8A shows another illustrative example of a graph of outputs from example circuits utilized to generate electric power in an apparatus by which at least portions of a card payment system may be implemented, and FIG. 8B shows still another illustrative example of a graph of outputs from example circuits utilized to generate electric power in an apparatus by which at least portions of a card payment system may be implemented.

Figure 9:
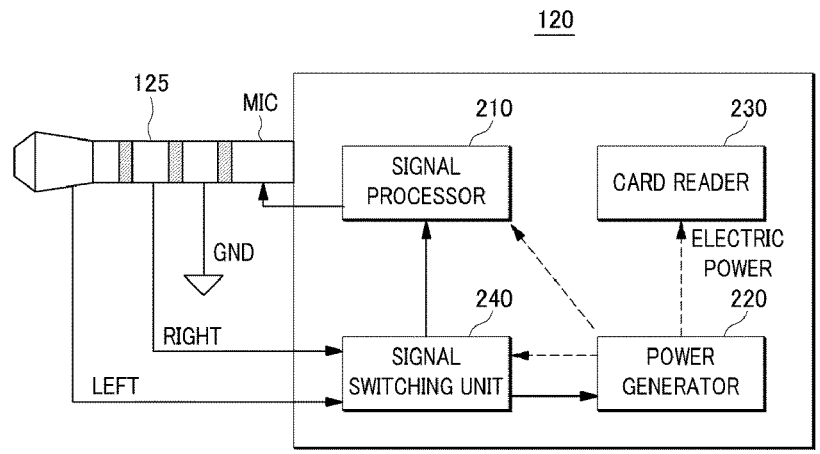
FIG. 9 shows yet another example configuration of a card payment apparatus by which at least portions of a card payment system may be implemented.

FIG. 9 shows yet another example configuration of card payment apparatus 120 by which at least portions of a card payment system may be implemented. As depicted in FIG. 9, card payment apparatus 120, which is described above with regard to FIG. 1, may include audio jack 125, a signal processor 210, a power generator 220, a card reader 230, and a signal switching unit 240. Although illustrated as discrete components, various components may be divided into additional components, combined into fewer components, or eliminated altogether while being contemplated within the scope of the disclosed subject matter. Each function and/or operation of the components may be implemented, individually and/or collectively, by a wide range of hardware, software, firmware, or any combination thereof. In that regard, one or more of signal processor 210, power generator 220, card reader 230, and signal switching unit 240 may be included in an instance of an application hosted by card payment apparatus 120.

Audio jack 125 may include at least one earphone contact, a ground contact and a microphone contact. By way of example, but not limitation, as depicted in FIG. 9, audio jack 125 may include two earphone contacts, one of which is connected to a left side earphone (i.e., left earphone contact) and the other one is connected to a right side earphone (i.e., right earphone contact).

In some embodiments, signal processor 210 may be configured to encode a counter value stored in a memory which is operatively coupled to card payment apparatus 120 into a onetime password by using any well-known encryption algorithm, using a personal identifier of a user of card payment apparatus 120 and a secret key of card payment apparatus 120. Further, signal processor 210 may be configured to convert a first digital signal that includes account information, which is read by card reader 230, and the onetime password into a first analog signal by using any well-known digital-analog converting scheme. Then, signal processor 210 may be configured to transmit the first analog signal to client device 110 via the microphone contact of audio jack 125.

In some other embodiments, the first digital signal may further include at least one of the personal identifier of the user of card payment apparatus 120 or a digital unique identifier of card payment apparatus 120 in addition to the account information and onetime password. Signal processor 210 may be configured to convert the first digital signal into a first analog signal and to transmit the first analog signal to client device 110 via the microphone contact of audio jack 125.

Further, signal processor 210 may be configured to receive, from signal switching unit 240, a second analog signal to which a second digital signal that includes a card read request is converted. Further, signal processor 210 may be configured to convert the second analog signal into the second digital signal by using any well-known analog-digital converting scheme.

Power generator 220 may be configured to receive an acoustic signal from signal switching unit 240. Power generator 220 may be further configured to convert electrical components of the received acoustic signal into electric power to operate card payment apparatus 120. Then, power generator 220 may be configured to provide at least one of signal processor 210, card reader 230 or signal switching unit 240 with the generated electric power.

Card reader 230 may be configured to read the account information of payment card 130. By way of example, but not limitation, the account information may include at least one of an account number, a card expiration date, etc. In some embodiments, card reader 230 may read the account information from a magnetic strip of payment card 130 or an integrated circuit chip of payment card 130. Card reader 230 may be further configured to transmit the read account information to signal processor 210.

Signal switching unit 240 may be configured to receive the acoustic signal from client device 110. In some embodiments, client device 110 may transmit, to signal switching unit 240, the acoustic signal that includes the second analog signal via a receptor for at least one earphone contact of audio jack 125. Signal switching unit 240 may be configured to determine that the second analog signal is transmitted from client device 110. Signal switching unit 240 may be further configured to extract the second analog signal from the received acoustic signal and to transmit the second analog signal to signal processor 210. By way of example, but not limitation, the acoustic signal may include a periodic signal portion and a non-periodic signal portion that is associated with the second digital signal. Signal switching unit 240 may extract the non-periodic signal portion of the acoustic signal and then, transmit the non-periodic signal portion of the acoustic signal to signal processor 210 and transmit the periodic signal portion of the acoustic signal to power generator 220.

In some embodiments, client device 110 may transmit, to signal switching unit 240, the second analog signal separately with an acoustic signal that is used to generate electric power. By way of example, but not limitation, signal switching unit 240 may receive the second analog signal via the left earphone contact and receive the acoustic signal via the right earphone contact. Then, signal switching unit 240 may be configured to transmit the second analog signal to signal processor 210 and to transmit the acoustic signal to power generator 220.

Thus, FIG. 9 shows another example configuration of card payment apparatus 120 by which at least portions of a card payment system may be implemented.

Figure 10:
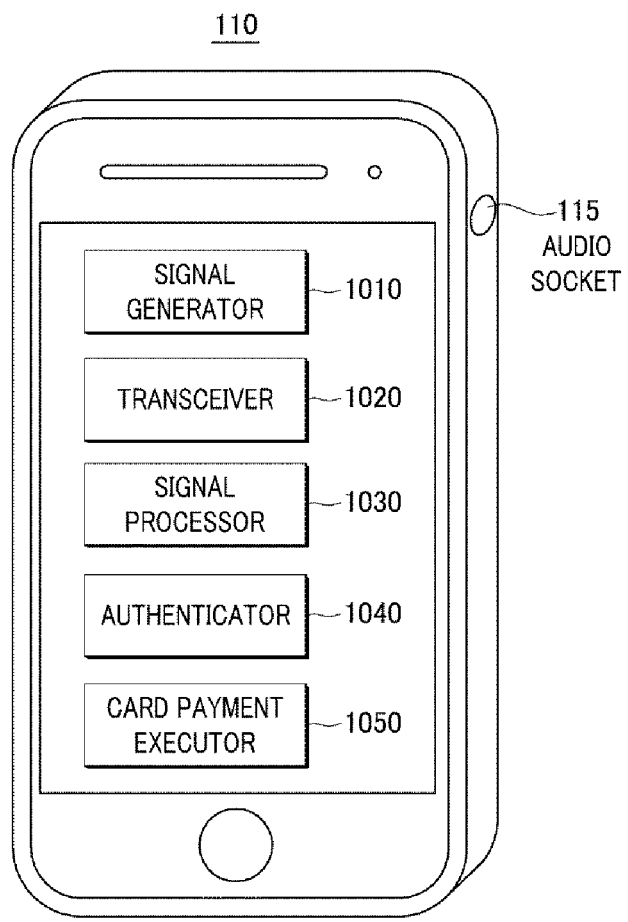
FIG. 10 shows an example configuration of a client device by which at least portions of a card payment system may be implemented.

FIG. 10 shows an example configuration of client device 110 by which at least portions of a card payment system may be implemented. As depicted in FIG. 10, client device 110, which is described above with regard to FIG. 1, may include audio jack socket 115, a signal generator 1010, a transceiver 1020, a signal processor 1030, an authenticator 1040, and a card payment executor 1050. Although illustrated as discrete components, various components may be divided into additional components, combined into fewer components, or eliminated altogether while being contemplated within the scope of the disclosed subject matter. Each function and/or operation of the components may be implemented, individually and/or collectively, by a wide range of hardware, software, firmware, or any combination thereof. In that regard, one or more of signal generator 1010, transceiver 1020, signal processor 1030, authenticator 1040, and card payment executor 1050 may be included in an instance of an application hosted by client device 110.

Audio jack socket 115 may be configured or shaped to receive audio jack 125 of card payment apparatus 120. By way of example, as depicted in FIG. 10, audio jack socket 115 may be installed on a surface of client device 110.

In some embodiments, signal generator 1010 may be configured to generate an acoustic signal. By way of example, but not limitation, the acoustic signal may be a periodic signal that has a frequency and a regular magnitude. Alternatively, the acoustic signal may be a non-periodic analog signal that includes multiple numbers of waveforms, each of which is set to have a different duration time.

In some other embodiments, signal generator 1010 may be configured to generate a second digital signal that includes a request for card payment apparatus 120 to read account information from payment card 130 based on at least one of a frequency, a bit rate, or a bit interval of at least one of a pulse signal or a rectangular signal.

In some other embodiments, signal generator 1010 may be configured to generate an acoustic signal that includes a second analog signal to which the card read request is converted. By way of example, but not limitation, the acoustic signal may include a periodic signal portion and a non-periodic signal portion that is associated with the second digital signal.

Further, signal generator 1010 may be configured to encrypt the acoustic signal and second digital signal by using any well-known encrypting scheme such as a Rivest Shamir Adleman scheme.

Transceiver 1020 may be configured to receive account information read by card reader 230 and a onetime password, via a receptor for a microphone contact of audio jack 120. Transceiver 1020 may be configured to further receive a personal identifier of a user of card payment apparatus 120 and a unique identifier of card payment apparatus 120, via the receptor for the microphone contact of audio jack 120. By way of example, but not limitation, transceiver 1020 may be configured to receive a first analog signal from card payment apparatus 120 via the receptor for the microphone contact of audio jack 125. The first analog signal is a signal to which a first digital signal, which includes the account information, onetime password, personal identifier, and unique identifier, is converted by card payment apparatus 120.

Transceiver 1020 may be further configured to transmit the acoustic signal and second analog signal to card payment apparatus 120, via a receptor for at least one earphone contact of audio jack 125. In some embodiments, transceiver 1020 may transmit the acoustic signal, via a first one of the earphone contact of audio jack 125, and transmit the second analog signal, via a second one of the earphone contact of audio jack 125.

Signal processor 1030 may be configured to convert the first analog signal into the account information, onetime password, personal identifier, and unique identifier by using any well-known analog-digital converting scheme. Further, signal processor 1030 may be configured to decode the onetime password into a counter value of card payment apparatus 120 by using any well-known encryption algorithm, using the personal identifier of the user of card payment apparatus 120 and a secret key of card payment apparatus 120.

Signal processor 1030 may be further configured to convert the second digital signal, which includes the card read request, into the second analog signal by using any well-known digital-analog converting scheme. In some embodiments, signal processor 1030 may be configured to convert the second digital signal into the second analog signal based on at least one of the multiple numbers of waveforms and duration times.

Authenticator 1040 may be configured to compare the counter value of card payment apparatus 120 and a counter value that is stored in a memory of client device 110. The counter value, which is stored in the memory of client device 110, may be set to an initial value, such as zero. Authenticator 1040 may increase the counter value of client device 110 by a predetermined value, such as one, when transceiver 1020 receives the account information and onetime password (i.e., when transceiver 1020 receives the first analog signal). Then, authenticator 1040 may store the increased counter value in the memory of client device 110. Upon comparing, authenticator 1040 may be configured to determine whether the counter value of card payment apparatus 120 corresponds to the increased counter value stored in the memory of client device 110. When the increased counter value of client device 110 is determined to correspond to the counter value of card payment apparatus 120, authenticator 1040 may authenticate card payment apparatus 120 as an authenticated apparatus.

Further, authenticator 1040 may be configured to authenticate card payment apparatus 120 based on the unique identifier of card payment apparatus 120. By way of example, but not limitation, the unique identifier of card payment apparatus 120 may be pre-registered in the memory of client device 110 or an authenticating server which is communicatively coupled to client device 110 and authenticator 1040 may determine that card payment apparatus 120 is a registered or authenticated apparatus by checking to the memory or authenticating server.

Card payment executor 1050 may be configured to execute a card payment based on the account information between a card payment server which is communicatively coupled to client device 110. If the account information is encrypted, card payment executor 1050 may be further configured to decrypt the encrypted account information.

Thus, FIG. 10 shows an example configuration of client device 110 by which at least portions of a card payment system may be implemented.

Figure 11:
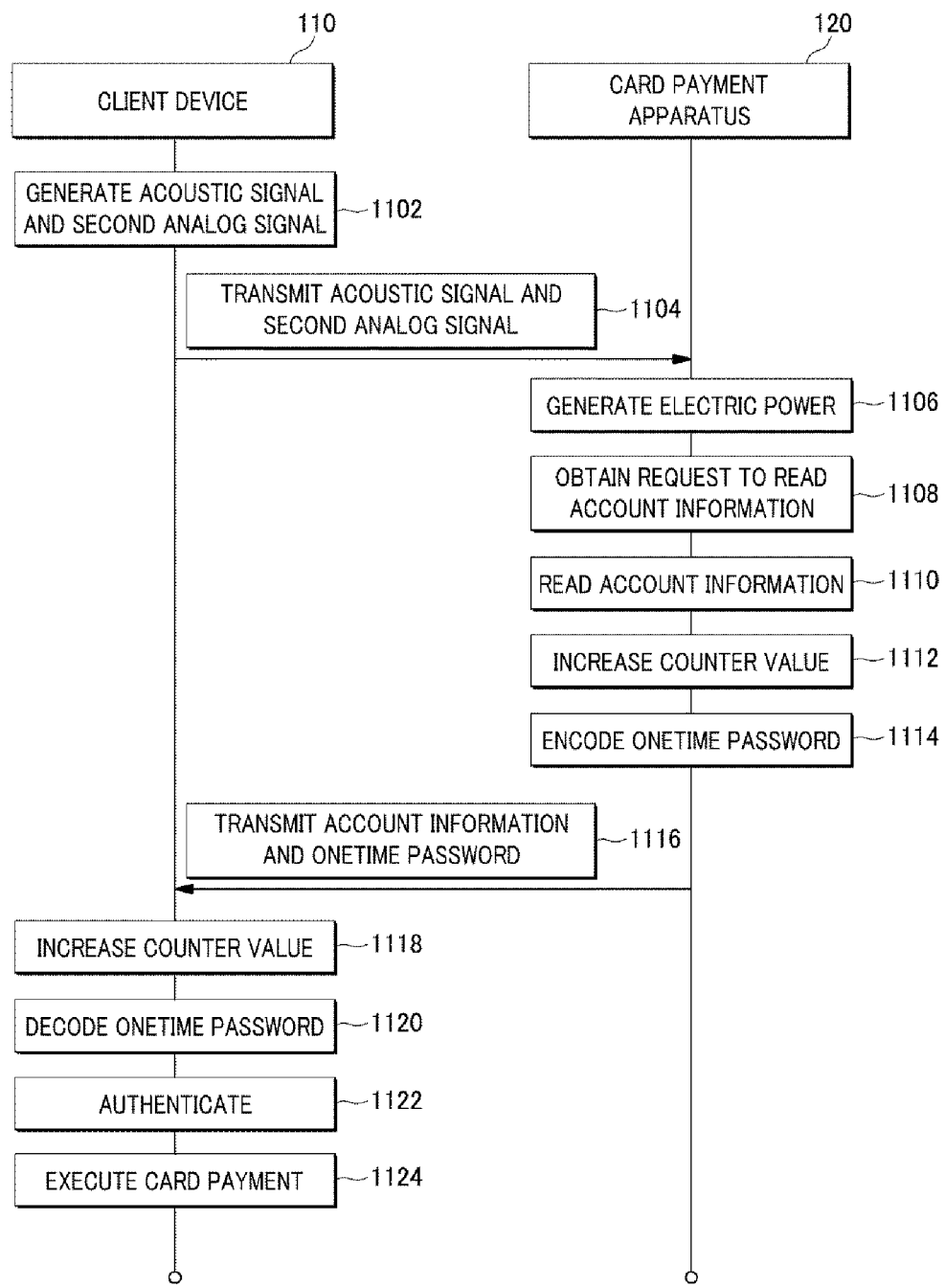
FIG. 11 shows an example processing flow of operations for implementing at least portions of a card payment system.

FIG. 11 shows an example processing flow of operations for implementing at least portions of a card payment system. The operations in FIG. 11 may be implemented in system configuration 100 including client device 110 and card payment apparatus 120, as described with reference to FIG. 1. An example process may include one or more operations, actions, or functions as illustrated by one or more blocks 1102, 1104, 1106, 1108, 1110, 1112, 1114, 1116, 1118, 1120, 1122 and/or 1124. Although illustrated as discrete blocks, various blocks may be divided into additional blocks, combined into fewer blocks, or eliminated, depending on the desired implementation. Processing may begin at block 1102.

Block 1102 (Generate Acoustic Signal and Second Analog Signal) may refer to client device 110 generating an acoustic signal and a second analog signal. By way of example, but not limitation, the acoustic signal may be a periodic signal that has a frequency and a regular magnitude. Alternatively, the acoustic signal may be a non-periodic analog signal that includes multiple numbers of waveforms, each of which is set to have a different duration time. Further, at block 1102, client device 110 may generate a second digital signal that includes a request for card payment apparatus 120 to read account information from payment card 130 and convert the second digital signal into a second analog signal. Processing may proceed from block 1102 to block 1104.

Block 1104 (Transmit Acoustic Signal and Second Analog Signal) may refer to client device 110 transmitting the acoustic signal and second analog signal to card payment apparatus 120. In some embodiments, client device 110 may transmit the acoustic signal that includes the second analog signal to card payment apparatus 120 a receptor for via at least one earphone contact of audio jack 125 of card payment apparatus 120. In some other embodiments, client device 110 may transmit the acoustic signal to card payment apparatus 120, via one of the two earphone contacts of audio jack 125, and transmit the second analog signal separately with the acoustic signal to card payment apparatus 120 via the other one of the two earphone contacts of audio jack 125. Processing may proceed from block 1104 to block 1106.

Block 1106 (Generate Electric Power) may refer to card payment apparatus 120 generating electric power to operate card payment apparatus 120. At block 1106, card payment apparatus 120 may receive, from client device 110, the acoustic signal via at least one earphone contact of audio jack 125. Card payment apparatus 120 may convert electrical components of the received acoustic signal into electric power to operate card payment apparatus 120. Processing may proceed from block 1106 to block 1108.

Block 1108 (Obtain Request to Read Account Information) may refer to card payment apparatus 120 obtaining a request to read account information. In some embodiments, card payment apparatus 120 may convert the second analog signal to the second digital signal, which includes the request to read the account information, by using any well-known analog-digital converting scheme so that card payment apparatus 120 may obtain the request to read the account information from payment card 130. Processing may proceed from block 1108 to block 1110.

Block 1110 (Read Account Information) may refer to card payment apparatus 120 reading the account information from payment card 130. By way of example, but not limitation, card payment apparatus 120 may read the account information from a magnetic strip of payment card 130 or an integrated circuit chip of payment card 130. Processing may proceed from block 1110 to block 1112.

Block 1112 (Increase Counter Value) may refer to card payment apparatus 120 increasing a counter value of card payment apparatus 120. By way of example, but not limitation, the counter value may be stored in a memory of card payment apparatus 120 and set to an initial value, such as zero. Card payment apparatus 120 may increase the counter value by a predetermined value, such as one, when card payment apparatus 120 reads the account information from payment card 130 at block 1110. Then, card payment apparatus 120 may store the increased counter value in the memory of card payment apparatus 120. Processing may proceed from block 1112 to block 1114.

Block 1114 (Encode Onetime Password) may refer to card payment apparatus 120 encoding a onetime password. In some embodiments, card payment apparatus 120 may encode the counter value stored in the memory of card payment apparatus 120 into the onetime password by using any well-known encryption algorithm, using a personal identifier of a user of card payment apparatus 120 and a secret key of card payment apparatus 120. Processing may proceed from block 1114 to block 1116.

Block 1116 (Transmit Account Information and Onetime Password) may refer to card payment apparatus 120 transmitting the account information and onetime password. In some embodiments, card payment apparatus 120 may convert the account information and onetime password into a first analog signal and transmit the first analog signal to client device 110, via a microphone contact of audio jack 125 of card payment apparatus 120. In some embodiments, card payment apparatus 120 may convert at least one of the personal identifier of the user or a digital unique identifier of card payment apparatus 120 as well as the account information and onetime password into a first analog signal and transmit the first analog signal to client device 110. At block 1116, client device 110 may receive and convert the first analog signal into the account information, onetime password, personal identifier of the user, and digital unique identifier of card payment apparatus 120 by using any well-known analog-digital converting scheme. Processing may proceed from block 1116 to block 1118.

Block 1118 (Increase Counter Value) may refer to client device 110 increasing a counter value of client device 110. By way of example, but not limitation, the counter value of client device 110 may be stored in a memory of client device 110 and set to an initial value, such as zero. Client device 110 may increase the counter value of client device 110 by a predetermined value, such as one, when client device 110 receives the account information and onetime password (i.e., when client device 110 receives the first analog signal) at block 1116. Then, client device 110 may store the increased counter value in the memory of client device 110. Processing may proceed from block 1118 to block 1120.

Block 1120 (Decode Onetime Password) may refer to client device 110 decoding the onetime password. Client device 110 may decode the onetime password into the counter value of card payment apparatus 120 by using any well-known encryption algorithm, using the personal identifier of the user of card payment apparatus 120. Processing may proceed from block 1120 to block 1122.

Block 1122 (Authenticate) may refer to client device 110 authenticating card payment apparatus 120. In some embodiments, client device 110 may compare the counter value of card payment apparatus 120, which is decoded at block 1120, and the counter value of client device 110, which is stored in the memory of client device 110. Upon comparing, client device 110 may determine that the counter value of card payment apparatus 120 corresponds to the counter value of client device 110. Then, client device 110 may authenticate card payment apparatus 120 as an authenticated apparatus. In some other embodiments, client device 110 may authenticate card payment apparatus 120 by further using the digital unique identifier of card payment apparatus 120. By way of example, but not limitation, the digital unique identifier of card payment apparatus 120 may be pre-registered in the memory of client device 110 or an authenticating server that is communicatively coupled to client device 110. Client device 110 may determine that card payment apparatus 120 is a registered or authenticated apparatus by checking to the memory or authenticating server. Processing may proceed from block 1122 to block 1124.

Block 1124 (Execute Card Payment) may refer to client device 110 executing card payment. Client device 110 may execute a card payment based on the account information through a card payment server which is communicatively coupled to client device 110.

Thus, FIG. 11 shows an example processing flow of operations for implementing at least portions of a card payment system.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 12:
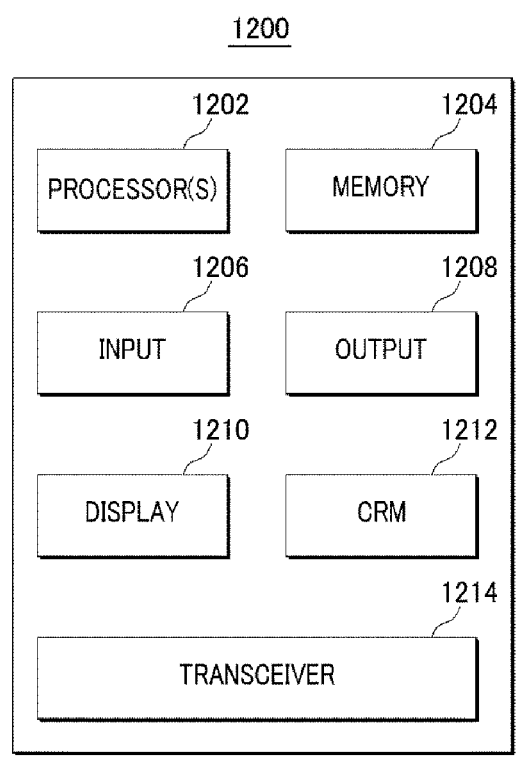
FIG. 12 shows an illustrative computing embodiment, in which any of the processes and sub-processes of a card payment system may be implemented as computer-readable instructions stored on a computer-readable medium.

FIG. 12 shows an illustrative computing embodiment, in which any of the processes and sub-processes of a card payment system may be implemented as computer-readable instructions stored on a computer-readable medium. The computer-readable instructions may, for example, be executed by a processor of a device, as referenced herein, having a network element and/or any other device corresponding thereto, particularly as applicable to the applications and/or programs described above corresponding to the configuration 100 for transactional permissions.

In a very basic configuration, a computing device 1200 may typically include, at least, one or more processors 1202, a system memory 1204, one or more input components 1206, one or more output components 1208, a display component 1210, a computer-readable medium 1212, and a transceiver 1214.

Processor 1202 may refer to, e.g., a microprocessor, a microcontroller, a digital signal processor, or any combination thereof.

Memory 1204 may refer to, e.g., a volatile memory, non-volatile memory, or any combination thereof. Memory 1204 may store, therein, an operating system, an application, and/or program data. That is, memory 1204 may store executable instructions to implement any of the functions or operations described above and, therefore, memory 1204 may be regarded as a computer-readable medium.

Input component 1206 may refer to a built-in or communicatively coupled keyboard, touch screen, or telecommunication device. Alternatively, input component 1206 may include a microphone that is configured, in cooperation with a voice-recognition program that may be stored in memory 1204, to receive voice commands from a user of computing device 1200. Further, input component 1206, if not built-in to computing device 1200, may be communicatively coupled thereto via short-range communication protocols including, but not limitation, radio frequency or Bluetooth.

Output component 1208 may refer to a component or module, built-in or removable from computing device 1200, that is configured to output commands and data to an external device.

Display component 1210 may refer to, e.g., a solid state display that may have touch input capabilities. That is, display component 1210 may include capabilities that may be shared with or replace those of input component 1206.

Computer-readable medium 1212 may refer to a separable machine readable medium that is configured to store one or more programs that embody any of the functions or operations described above. That is, computer-readable medium 1212, which may be received into or otherwise connected to a drive component of computing device 1200, may store executable instructions to implement any of the functions or operations described above. These instructions may be complimentary or otherwise independent of those stored by memory 1204.

Transceiver 1214 may refer to a network communication link for computing device 1200, configured as a wired network or direct-wired connection. Alternatively, transceiver 1214 may be configured as a wireless connection, e.g., radio frequency (RE), infrared, Bluetooth, and other wireless protocols.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

We claim:

1. A card payment system, comprising:
   a card payment apparatus, having an audio jack, configured to:
      read account information stored on a payment card,
      vary a counter value of the card payment apparatus, when the card payment apparatus reads the account information,
      store the varied counter value of the card payment apparatus in a memory of the card payment apparatus,
      encode the varied counter value of the card payment apparatus into a onetime password,
      transmit the account information and the onetime password via a microphone contact of the audio jack, and
      receive an acoustic signal via at least one earphone contact of the audio jack; and
   a client device, having an audio jack socket to receive the audio jack, configured to:
      receive, from the card payment apparatus, the account information and the onetime password via a receptor for the microphone contact of the audio jack,
      vary a counter value of the client device when the client device receives the account information and the onetime password,
      store the varied counter value of the client device in a memory of the client device,
      transmit, to the card payment apparatus, the acoustic signal via a receptor for the at least one earphone contact of the audio jack,
      decode the onetime password into the varied counter value of the card payment apparatus, and authenticate the card payment apparatus based on the varied counter value of the card payment apparatus and the varied counter value of the client device.

2. The card payment system of claim 1, wherein the client device is further configured to execute a card payment based on the account information through a card payment server.

3. The card payment system of claim 1,
wherein the card payment apparatus is configured to transmit the account information and onetime password by:
converting the account information and the onetime password into a first analog signal, and
transmitting the first analog signal to the client device via the microphone contact, and
wherein the client device is configured to receive the account information and the onetime password by:
receiving the first analog signal via the receptor for the microphone contact from the card payment apparatus, and
converting the first analog signal into the account information and the onetime password.

4. The card payment system of claim 3,
wherein the acoustic signal includes a second analog signal,
wherein the client device is further configured to convert a digital signal request to read the account information into the second analog signal, and
wherein the card payment apparatus is further configured to convert the second analog signal into the digital signal request to read the account information.

5. The card payment system of claim 4,
wherein the second analog signal is a non periodic signal,
wherein the second analog signal includes a plurality of waveforms, each of which is set to have a different duration time, and
wherein the client device is further configured to convert the digital signal request into the second analog signal based on at least one of the plurality of waveforms and the duration time.

6. The card payment system of claim 1, wherein the card payment apparatus is further configured to convert electrical components of the received acoustic signal into electric power to operate the card payment apparatus.

7. The card payment system of claim 6,
wherein the card payment apparatus is further configured to transform an alternating current (AC) voltage of the acoustic signal to a direct current (DC) voltage,
wherein the acoustic signal is a pulse signal having at least one charging duration and at least one discharging duration, and
wherein an absolute value of a voltage increase of the DC voltage in the at least one charging duration is greater than an absolute value of a voltage decrease of the DC voltage in the at least one discharging duration.

8. An apparatus, comprising:
an audio jack having at least one earphone contact and a microphone contact;
a card reader configured to read account information stored on a payment card; and
a signal processor configured to:
vary a counter value, when the card reader reads the account information,
store the varied counter value in a memory,
encode the varied counter value into a onetime password, and
transmit, to a client device, the account information and the onetime password via the microphone contact.

9. The apparatus of claim 8,
wherein the signal processor is configured to encode the varied counter value into the onetime password using a personal identifier, and
wherein the signal processor is further configured to transmit, to the client device, the personal identifier via the microphone contact.

10. The apparatus of claim 9,
wherein the signal processor is configured to transmit the account information, onetime password and personal identifier by:
converting the account information, onetime password and personal identifier into a first analog signal, and
transmitting the first analog signal to the client device via the microphone contact.

11. The apparatus of claim 10,
wherein the signal processor is configured to further transmit a digital unique identifier of the apparatus to the client device, and
wherein the signal processor is configured to transmit the digital unique identifier by:
converting the digital unique identifier into the first analog signal.

12. The apparatus of claim 8,
wherein the signal processor is further configured to:
receive, via the at least one earphone contact, an acoustic signal and a second analog signal, and
convert the second analog signal into a digital signal request to read the account information.

13. The apparatus of claim 12, further comprising:
a power generator configured to:
receive, from the client device, the acoustic signal via the at least one earphone contact, and
convert electrical components of the received acoustic signal into electric power to operate the apparatus.

14. The apparatus of claim 13,
wherein the power generator is further configured to transform an alternating current (AC) voltage of the acoustic signal to a direct current (DC) voltage,
wherein the acoustic signal is a pulse signal having at least one charging duration and at least one discharging duration, and
wherein an absolute value of a voltage increase of the DC voltage in the at least one charging duration is greater than an absolute value of a voltage decrease of the DC voltage in the at least one discharging duration.

15. The apparatus of claim 13,
wherein the audio jack has two earphone contacts,
wherein the signal processor is configured to receive the second analog signal via a first one of the earphone contacts, and
wherein the power generator is configured to receive the acoustic signal via a second one of the earphone contacts.

16. The apparatus of claim 13,
wherein the second analog signal is a non periodic signal,
wherein the second analog signal includes a plurality of waveforms, each of which is set to have a different duration time, and
wherein the signal processor is further configured to convert the second analog signal into the digital signal request based on at least one of the plurality of waveforms and the duration time.

17. The apparatus of claim 8, further comprising:
a signal switching unit configured to:
- receive, from the client device via the at least one earphone contact, an acoustic signal and a second analog signal,
- transmit the second analog signal to the signal processor, and
- transmit the acoustic signal to a power generator; and a power generator configured to:
- receive the acoustic signal from the signal switching unit, and
- convert electrical components of the received acoustic signal into electric power to operate the apparatus, wherein the signal processor is further configured to:
- receive the second analog signal from the signal switching unit, and
- convert the second analog signal into a digital signal request to read the account information.

18. A client device, comprising:
an audio jack socket configured to receive an audio jack of a card payment apparatus, the audio jack including at least one earphone contact and a microphone contact;
a transceiver configured to:
- receive, from the microphone contact, account information stored on a payment card and a onetime password, and
- transmit, to the at least one earphone contact, a request to read the account information;

a signal generator configured to generate the request;
a signal processor configured to decode the onetime password into a counter value of the card payment apparatus; and
an authenticator configured to:
- vary a counter value of the client device when the transceiver receives the account information and the onetime password,
- store the varied counter value in a memory of the client device,
- determine that the counter value of the card payment apparatus corresponds to the varied counter value, and
- authenticate the card payment apparatus.

19. The client device of claim 18, further comprising:
a card payment executor configured to execute a card payment based on the account information through a card payment server.

20. The client device of claim 18,
wherein the transceiver is further configured to receive a personal identifier from the microphone contact, and
wherein the signal processor is further configured to decode the onetime password using the personal identifier.

21. The client device of claim 20,
wherein the transceiver is configured to further receive, via the microphone contact, a unique identifier of the card payment apparatus, and
wherein the authenticator is further configured to authenticate the card payment apparatus based on the unique identifier of the card payment apparatus.

22. The client device of claim 21,
wherein the transceiver is configured to receive a first analog signal, and
wherein the signal processor is further configured to convert the first analog signal into the account information, onetime password, personal identifier and unique identifier.

23. The client device of claim 22,
wherein the signal processor is further configured to convert the request into a second analog signal, and
wherein the transceiver is configured to transmit the request by transmitting the second analog signal.

24. The client device of claim 23,
wherein the audio jack has two earphone contacts, and
wherein the transceiver is further configured to transmit an acoustic signal via a first one of the earphone contacts, and
wherein the transceiver is further configured to transmit the second analog signal via a second one of the earphone contacts.

25. The client device of claim 23,
wherein the second analog signal is a non periodic signal,
wherein the second analog signal includes a plurality of waveforms, each of which is set to have a different duration time, and
wherein the signal processor is further configured to convert the request into the second analog signal based on at least one of the plurality of waveforms and the duration time.

* * * * *